United States Patent [19]

Smith

[11] Patent Number: 5,832,133
[45] Date of Patent: Nov. 3, 1998

[54] APPARATUS AND METHOD FOR ALTERING AND DISPLAYING ATTRIBUTES OF THE IMAGE

[75] Inventor: Jonathan Price Smith, Basingstoke, England

[73] Assignee: Quantel, Ltd., England

[21] Appl. No.: 674,218

[22] Filed: Jul. 1, 1996

Related U.S. Application Data

[63] Continuation of Ser. No. 225,897, Apr. 11, 1994, abandoned.

[30] Foreign Application Priority Data

Apr. 14, 1993 [GB] United Kingdom .................... 9307656

[51] Int. Cl.$^6$ .............................. G06K 9/40; G06K 9/00; G06K 9/20; G06K 9/32
[52] U.S. Cl. ........................... 382/254; 348/96; 358/518; 382/317; 382/318; 382/274; 382/299
[58] Field of Search .................................... 382/254, 317, 382/318, 319, 274, 299; 348/96, 97; 358/518–523, 527, 531

[56] References Cited

U.S. PATENT DOCUMENTS

| | | | |
|---|---|---|---|
| 4,096,523 | 6/1978 | Belmares-Sarabia et al. ........... | 358/80 |
| 4,623,973 | 11/1986 | Hoffrichter et al. ..................... | 365/526 |
| 4,829,455 | 5/1989 | Long et al. .............................. | 364/521 |
| 4,829,584 | 5/1989 | Shimano .................................. | 382/41 |
| 4,864,388 | 9/1989 | Skrydstrup .............................. | 358/22 |
| 4,908,874 | 3/1990 | Gabriel .................................... | 382/41 |
| 4,992,861 | 2/1991 | D'Errico .................................. | 358/75 |
| 5,010,410 | 4/1991 | Bernstein ................................. | 348/97 |
| 5,012,333 | 4/1991 | Lee et al. ................................. | 358/80 |
| 5,012,346 | 4/1991 | DeJager et al. .......................... | 358/214 |
| 5,155,588 | 10/1992 | Levien ...................................... | 358/80 |
| 5,157,482 | 10/1992 | Cosgrove ................................. | 348/96 |
| 5,185,673 | 2/1993 | Sobol ....................................... | 358/296 |
| 5,218,455 | 6/1993 | Kristy ...................................... | 382/41 |
| 5,224,178 | 6/1993 | Madden et al. .......................... | 382/50 |
| 5,287,418 | 2/1994 | Kishida .................................... | 382/54 |
| 5,295,204 | 3/1994 | Parulski ................................... | 382/41 |
| 5,398,121 | 3/1995 | Kowalewski et al. ................... | 358/504 |

FOREIGN PATENT DOCUMENTS

| | | | |
|---|---|---|---|
| 0090596 | 10/1983 | European Pat. Off. .......... | G03F 3/08 |
| 0196044 | 10/1986 | European Pat. Off. ......... | H04N 1/40 |
| 0350870 | 1/1990 | European Pat. Off. ......... | H04N 1/46 |
| 0377386 | 7/1990 | European Pat. Off. ......... | H04N 1/40 |
| 0410719 | 1/1991 | European Pat. Off. ......... | H04N 1/46 |
| 0441609 | 8/1991 | European Pat. Off. ......... | H04N 1/46 |

(List continued on next page.)

OTHER PUBLICATIONS

Observations on Patentability under Section 21, U.K. Patent Application No. 9307656.0, Publication No. GB 2 277 220, Applicant: Quantel Limited.
Product literature.
Circuit Diagrams of URSA Telecine System and ADS 2 system.

*Primary Examiner*—Bipin Shalwala
*Attorney, Agent, or Firm*—Cooper & Dunham LLP

[57] ABSTRACT

An electronic image processing system includes a scanner in which a light source is provided to illuminate an image captured on a film. A charge-coupled device produces digital data defining a multiplicity of picture elements which together represent the image. A look up table converts the data from the CCD into a format suitable for processing by a processor which data is stored in a framestore. The data in the framestore is read and processed by the processor and output for display of the image on a monitor. Characteristics or attributes of the displayed image are adjusted by the processor in response to user manipulation of a stylus and touch tablet device. Once the user is satisfied with the image as displayed the adjustment is used to alter the manner in which the scanner and look up table operate so that a further scanning of the image will provide data in the framestore representing the image with characteristics or attributes similar to those in the previously displayed image.

16 Claims, 3 Drawing Sheets

FOREIGN PATENT DOCUMENTS

| | | | |
|---|---|---|---|
| 0482790 | 4/1992 | European Pat. Off. | H04N 1/40 |
| 0497325 | 8/1992 | European Pat. Off. | H04N 1/46 |
| 0514166 | 11/1992 | European Pat. Off. | H04N 1/40 |
| 0514746 | 11/1992 | European Pat. Off. | H04N 1/46 |
| 0555866 | 8/1993 | European Pat. Off. | H04N 1/46 |
| 2053619 | 2/1981 | United Kingdom | H04N 1/46 |
| 2260669 | 4/1993 | United Kingdom | H04N 1/46 |
| 9205668 | 4/1992 | WIPO | H04N 9/11 |

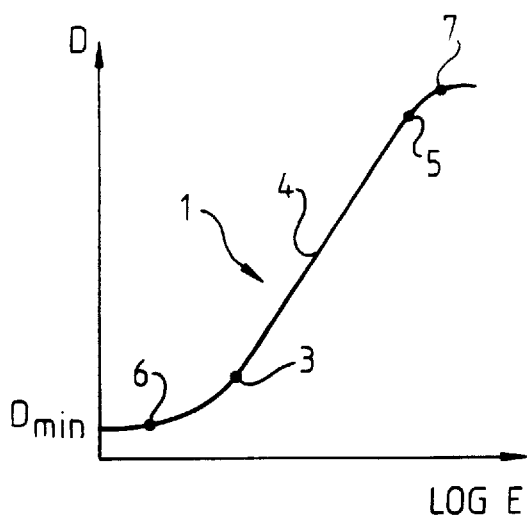
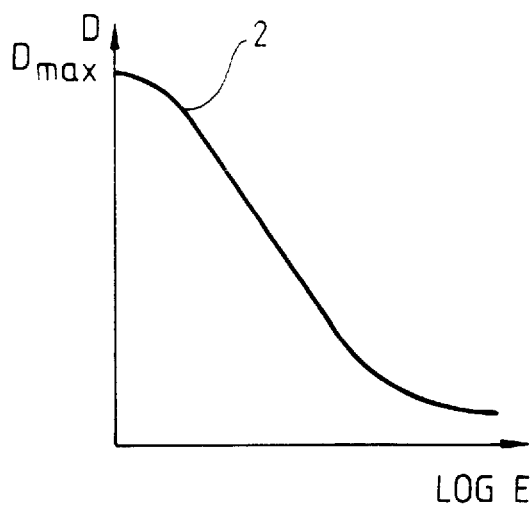
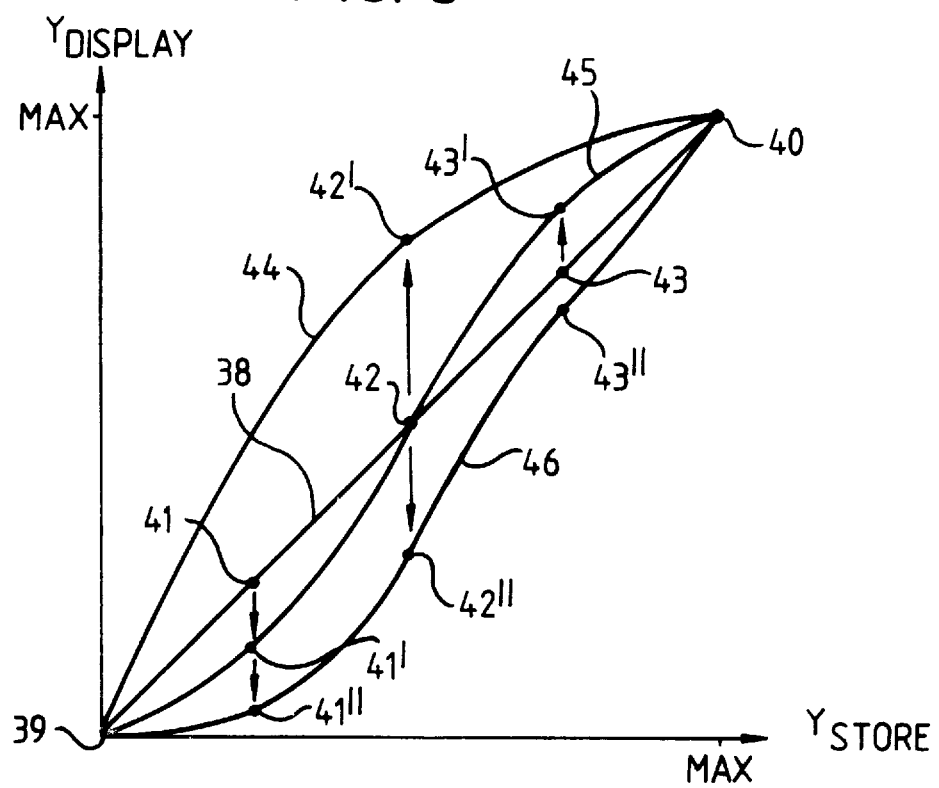

APPARATUS AND METHOD FOR ALTERING AND DISPLAYING ATTRIBUTES OF THE IMAGE

This is a continuation of application Ser. No. 08/225,897 filed Apr. 11, 1994 now abandoned.

BACKGROUND OF THE INVENTION

1. Field of the Invention

The invention relates to an apparatus for and a method of image processing. Particularly, but not exclusively, the invention relates to an electronic apparatus for and method of processing digital data representing an image captured on an image medium.

2. Description of the Related Art

The faithful capturing of an image on an image capture medium such as negative or reversal film is a complex issue. Film emulsion is responsive to the logarithm of the amount of light falling on the emulsion. That is to say, the response of the emulsion varies with variations in the intensity of light to which the emulsion is exposed and with changes in time for which the emulsion is exposed to light, and in a developed negative the density of the emulsion is proportional to the log of the exposure. The manner in which an emulsion responds to exposure can be plotted in a graph of emulsion density against the log of the exposure and the plot thus produced is known as the characteristic curve of the film.

An exemplary characteristic curve 1 of a negative film is shown in FIG. 1 of the accompanying drawings and an exemplary characteristic curve 2 of a reversal film (for which density is inversely proportional to the log of light intensity) is shown in FIG. 2 of the accompanying drawings. Referring to FIG. 1 the characteristic curve 1 for negative film has a minimum density value $D_{min}$ which is not equal to zero because the film substrate is not perfectly clear and because of a slight fogging of the emulsion unavoidably caused by the developer in the developing process. At low exposures small changes in exposure are not enough to change the density of the emulsion. The slope of the curve gradually increases until at a point 3 the path of the curve follows a substantially straight line 4. At the other end of the curve after the point 5 the slope again levels off and further increases in exposure have no further effect on the density of the emulsion because the emulsion has reacted completely to the light and no further change is possible. It follows that film emulsion has a useful exposure range which is limited at one end by a minimum useful exposure 6 and at the other end by a maximum useful exposure 7. The minimum useful exposure is the exposure where a measurable density above the fog level is produced and where the slope of the curve is sufficiently steep for a slight change in light level to be distinguishable. The maximum useful exposure is similarly defined.

The characteristic curve for reversal film in FIG. 2 of the drawings shows that reversal emulsion behaves in a similar manner except that the density of unexposed film is maximum $D_{max}$ and the density falls to a minimum for large exposures.

The gradient of the straight line portion of a characteristic curve, referred to as the gamma of the emulsion, is the rate at which density changes for a given change in exposure. For the same scene an emulsion with a higher gamma, corresponding to a steeper straight line, will result in greater density differences in the captured image. In other words the captured image will have a higher contrast as compared to an image captured on a film with a lower gamma.

In the capturing of an image on film different scene brightnesses are recorded as different densities in the emulsion. The straight line portion of the curve is the region in which tonal values in a scene are most faithfully recorded. Exposure of the film within this region results in a distinct image where emulsion densities vary substantially in proportion to the brightness in the scene. However, the cameraman is not limited to exposing the film within this region and can choose any exposure he pleases. Overall under exposure of a captured image will result in smoky, flattened shadows as the exposure is moved towards the minimum useful exposure and overall over exposure will result in an image with flat veiled highlights. Also, different emulsions have different characteristic curves, with many having a long minimum exposure region with a shallow slope sufficient to produce distinct tonal variations in dark shadow areas. cameramen intuitively select a particular film and under or over expose it in order to give mood to a captured image. Of course film is also over or under exposed accidentally.

Variations in exposure within the useful exposure range will result in the capture of images that are overall either darker or lighter than one another. However, as long as the exposure is not outside the useful exposure range information about the scene in the captured image will not be lost; the relationship between various brightnesses and tones will remain the same along the characteristic curve and any errors in exposure can be corrected when the captured image is subsequently transferred from the film to another light sensitive medium. Thus, for example when transferring an under exposed image from one film to another the image in the other film can be corrected by increasing the exposure of the other film.

Electronic scanners are available for converting a captured image into digital data defining a multiplicity of picture elements (pixels) which together represent the image. A scanner generally comprises a light source for illuminating an image and a scanning device such as a charge coupled device (CCD) in an electronic camera for scanning the image and producing pixel data representative thereof. The intensity of the light source is adjustable and a given CCD responds in a particular manner to different light levels. The scanner therefore has a transfer function which defines the relationship between tones in the captured image and their representation by the digital data. Operation of the scanner can be adjusted to vary the intensities in the image as represented by the digital data.

High resolution scanners are available for producing digital pixel data representing a high resolution image. Scanners used in the movie industry typically produce data representing single film frame as approximately 2000×3000 pixels, this being the minimum resolution acceptable to the industry. The scanning of a film frame is a relatively slow process typically taking over 30 seconds to complete. It is necessary to adjust operation of the scanner before an image is scanned so that once scanned the pixel data provides the desired representation of the image, be it a faithful reproduction, an under or over exposure or a corrected exposure. Hitherto this has been a time consuming procedure because the operator must first estimate the required scanner settings, then scan the image, then consider the scanned image, then adjust the scanner settings and then re-scan the image, the procedure being repeated until the image data provided by the scanner represents the image with the desired characteristics. Since each scan typically takes about 30 seconds there is a considerable delay between adjusting the scanner and being able to inspect the result of the adjustment in the scanned image, making it difficult for the operator to get a feel for what he is doing.

SUMMARY OF THE INVENTION

In one aspect the invention provides an electronic image processing apparatus for processing digital data representing an image captured on an image medium and having attributes determined by the capturing of the image and characteristics of the image medium, the apparatus comprising: image scanning means for scanning the captured image to produce digital image data defining a multiplicity of image elements which together represent the image; converting means for converting data from the scanning means into data in a format suitable for digital processing, the image attributes being changed as a consequence of the scanning and converting; storing means for storing the converted image data from the scanning means; displaying means for displaying an image derived from the data in the storing means; and processing means operable in a preview mode for reading the data from the storing means, altering the read data in accordance with an alteration function determined in response to signals input thereto by user manipulation of an input device, the processor thereby altering the attributes of the image represented by the read data and outputting the altered read data to the displaying means for display of the altered image to enable user inspection of the altered attributes thereof, and operable in a control mode for generating control data depending on the alteration function determined during the preview mode for effecting a corresponding alteration to the scanning by said scanning means and converting by the converting means so that in a subsequent scanning and converting operation the image attributes are changed to values closer to those of the image previously displayed on the display means in said preview mode.

In another aspect the invention provides a method of processing digital data representing an image captured on an image medium and having attributes determined by the capturing of the image and characteristics of the image medium, the method comprising: scanning the captured image to produce digital image data defining a multiplicity of image elements which together represent the image; converting the data produced by the scanning into data in a format suitable for digital processing, the image attributes being changed as a consequence of said scanning and converting; storing the converted image data in a store; displaying an image derived from the stored data; reading the data from the store; manipulating an input device to determine an alteration function; altering the read data in accordance with the alteration function so as to alter the attributes of the image represented thereby; displaying the altered image represented by the altered data to enable user inspection of the altered attributes thereof; generating control data depending on the alteration function; and effecting on the basis of the control data a corresponding alteration to the scanning and converting operation so that in a subsequent scanning and converting operation the image attributes are changed to values closer to those of the previously displayed image.

The above and further features of the invention are set forth with particularity in the appended claims and together with advantages thereof will become clearer from consideration of the following detailed description of an exemplary embodiment of the invention given with reference to the accompanying drawings.

BRIEF DESCRIPTION OF THE DRAWINGS

FIG. 1 is a graph of a characteristic curve of a negative film emulsion, as previously discussed hereinabove;

FIG. 2 is a graph of a characteristic curve of a reversal film emulsion, as previously discussed hereinabove;

FIG. 5 is a plot of a user definable alteration function.

DESCRIPTION OF THE PREFERRED EMBODIMENTS

Figure 3:
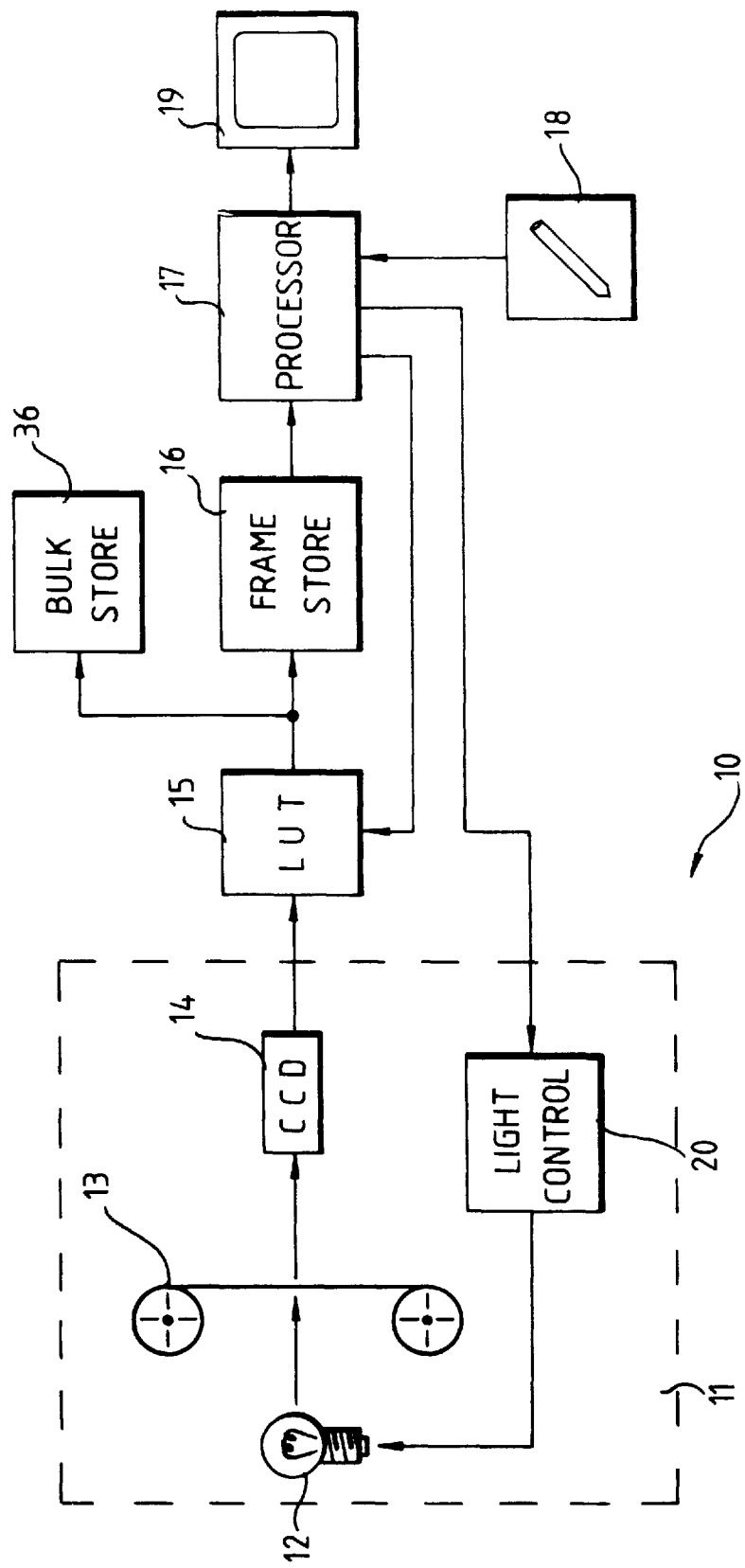
FIG. 3 is a schematic block diagram of an electronic image processing apparatus embodying the invention.

Referring now to FIG. 3 of the accompanying drawings an electronic image processing system 10 comprises a scanner 11 in which a light source 12 is provided to illuminate an image captured on a film 13. Light passing through the film 13 is detected by a charge coupled device (CCD) 14 which produces digital data defining a multiplicity of picture elements (pixels) which together represent the image. The CCD 14 produces data defining each pixel in terms of its red, green and blue colour components with each colour component of each pixel being defined by a 12-bit binary word. The data for each pixel from the CCD 14 is input to a look up table (LUT) 15 for conversion to a format suitable for storing in a frame store 16.

For the sake of simplicity only a single line is shown connecting the CCD 14 to the look up table 15 but it should be appreciated that in fact the system 10 comprises three separate look up tables, one for each of the red, green and blue colour component data output from the CCD 14. The system 10 is intended for use in the movie industry and the scanner 11 must be capable of producing data representing the image at an acceptable resolution. Thus, the scanner 11 is capable of producing data defining of the order of 2000× 3000 pixels which together represent the image captured on the film 13. Using presently available technology the scanner takes approximately 30 seconds to output pixel data for the whole image.

Once all of the data representing the image, as provided by the scanner 11, has been stored in the store 16 it can be processed by a processor 17 under user control. To this end the system is provided with a user operable stylus and touch tablet device 18 which generates input signals in response to user manipulation of the stylus on the touch tablet 18. The processor 17 is arranged to respond to the input signals by processing data from the store 16 to produce data representing a modified version of the image and outputting the thus processed data to a monitor 19 for display of the modified image. The processing provided by the processor 17 will be described in greater detail hereinafter.

By varying the amount of light from the light source 12 illuminating the film 13, the CCD 14 may be under exposed, over exposed or correctly exposed (the term "correctly" being used herein merely to indicate an exposure level between under and over exposed levels) resulting in the CCD producing data representing an under, correctly or over exposed image. The scanner includes a light controller 20 which responds to signals from the processor to adjust the amount of light emitted from the source 12. The source 12 includes red, green and blue filters (not shown) which enable the three colours to illuminate the film 13 at separate times with the intensity being adjustable for each colour component. Each image scan comprises a red scan, a green scan and a blue scan, thus increasing the length of time taken to scan the film but also improving considerably the colour quality in the scan. In order to simplify further explanation the scanning of a single colour only will be described but it should be noted that the process is applicable equally to all three colour components.

For the sake of convenience and in order to reduce cost, the data in the frame store 16 represents the image in terms of its luminance (Y) and chrominance (Cr, Cb). A large number of image processing techniques have been developed for television in which an image is commonly defined in terms of its Y and Cr, Cb content. By storing the image in the frame store 16 as YCrCb data the processor 17 is able to make use of any desired technique from the large number of standard and readily available techniques without the need for any alteration to the technique before use. RGB data from the CCD 14 is converted into YCrCb data by the look up table 15. The conversion from RGB to YCrCb, and indeed to other formats, is well known and will not be described further herein.

When an image is captured on negative film the look up table 15 defines values which convert the negative image to a positive image. This image reversal is also well known and will not be described further herein. The frame store 16 comprises a multiplicity of storage locations (not shown), at least one location being provided for the data of each pixel in the image from the scanner 11. Each storage location is only able to store each of the luminance (Y) and chrominance (CrCb) data as an 8-bit byte. Therefore, the look up table 15 is arranged to convert the 12-bit R,G,B data from the CCD into 8-bit Y,Cr,Cb data for storage in the frame store 16.

As mentioned hereinbefore, the manner in which film emulsion responds to light varies depending on the amount of light falling on the emulsion. That is to say, the response varies with variations in the intensity of light or variations in the time that the emulsion is exposed to light and, as previously discussed herein, can be represented by a characteristic curve. Similarly, the response of the CCD 14 varies with exposure of the CCD to light and therefore the behaviour of the scanner can be represented by a transfer function of tones in the image represented by the data output from the CCD against tones in the image represented by the emulsion of the film. The transfer function defines a curve which can be regarded as being the equivalent of the characteristic curve of the film and indeed may be similar in form to the characteristic curve of film, depending on the device used. The conversion function performed by the look up table 15 of converting image tones in the image represented by the data from the CCD into image tones in the image represented by the data for the processor is not a linear function because in the conversion from 12-bit data to 8-bit data image information is inevitably lost. As will be explained in greater detail hereinbelow the conversion function provided by the look up table 15 is defined in such a way as to minimize the loss of required information in the converted data.

Figure 4:
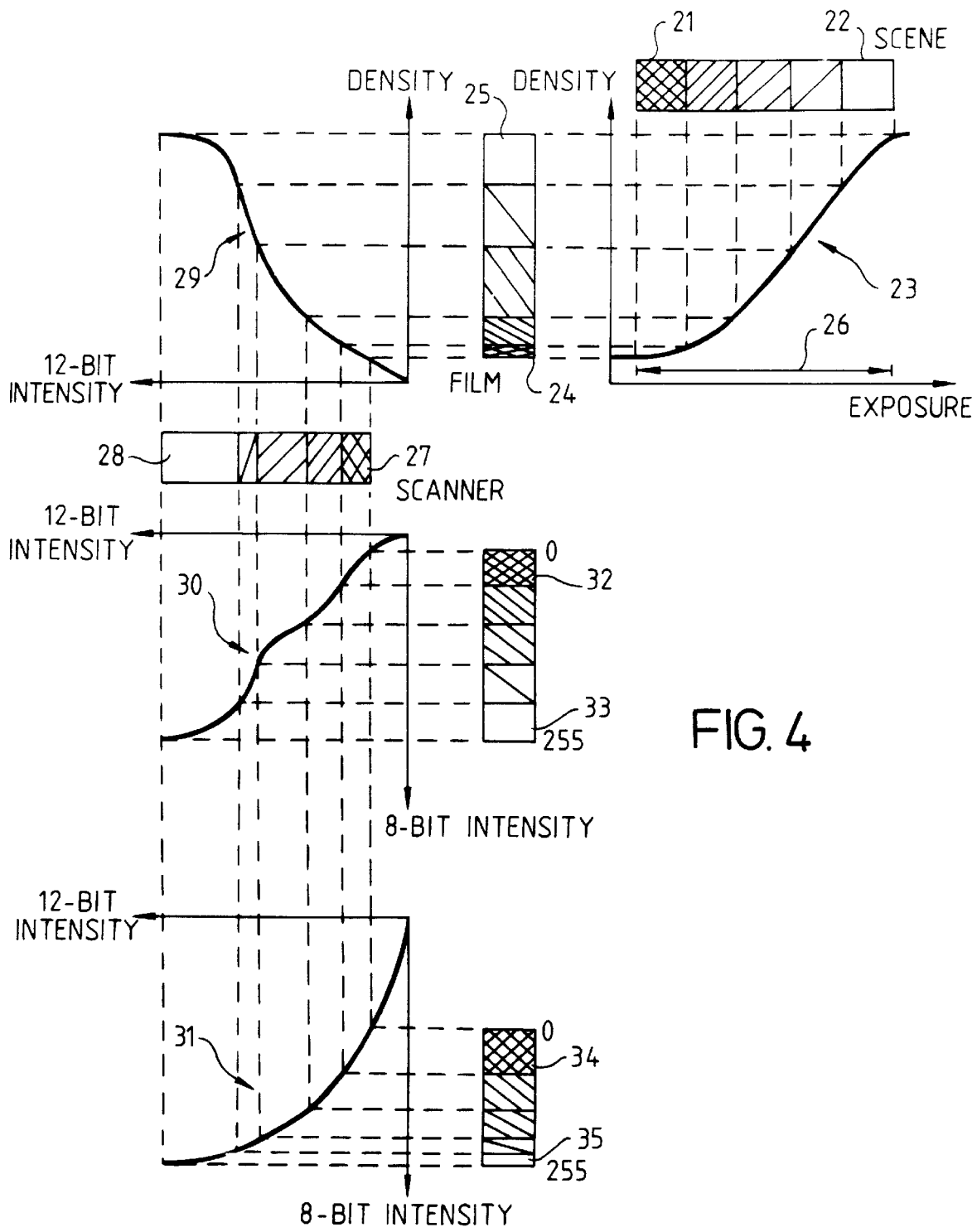
FIG. 4 illustrates the effect that various characteristic curves, transfer functions and conversion functions have on tones in the image of a scene.

The effect that the characteristic curve of the film, the transfer function of the scanner, and the conversion function of the look up table have on tones in the image of a scene is illustrated in FIG. 4 of the accompanying drawings. An initial scene is assumed to comprise five different, evenly spaced, brightnesses (exposures) ranging from black 21 to white 22. An image of the scene captured on negative film, having a characteristic curve 23, represents the five brightnesses 21 to 22 in the scene by five different emulsion densities ranging from a minimum density 24 (corresponding to the black 21 in the scene) to a maximum density 25 (corresponding to the white 22 in the scene). It should be noted that the film has a useful exposure range 26 corresponding to the range of brightnesses 21 to 22 in the scene. The characteristic curve 23 is non-linear and consequently the emulsion densities 24 to 25, unlike the scene brightnesses 21 to 22, are not evenly spaced.

As the image is scanned by the scanner 11 the five emulsion densities 24 to 25 are converted into five intensity values ranging from a value 27 corresponding to the black in the scene to a value 28 corresponding to the white in the scene, depending on the transfer function of the scanner which is represented by a curve 29 in FIG. 4. Again, it should be noted that since the transfer function of the scanner is non-linear the spacing between the intensity values 27 to 28 does not correspond to the spacing between the emulsion densities 24 to 25 and does not correspond to the spacing between the brightnesses 21 to 22 in the scene.

The 12-bit data from the CCD 14 is able to represent $2^{12}$, i.e. 4096, different colour intensities, whereas the 8-bit data in the store 16 is able to represent only $2^8$, i.e 256, different colour intensities. There is therefore an inevitable loss of information when converting from 12-bit data to 8-bit data. In order to minimize the loss of information the look up table 15 is arranged to convert only a selected range of 12-bit intensity values into 8-bit intensity values. FIG. 4 shows two different conversion curves 30 and 31 representing two exemplary conversions that can be performed by the look up table 15. The conversion represented by the curve 30 converts 12-bit values across the full range into corresponding 8-bit intensity values. The conversion curve 30 is non-linear in order to compensate for the non-linearity of the characteristic curve 23 and of the transfer curve 29 and to yield an 8-bit image with intensity values 32 to 33 which over their range are a faithful reproduction of the brightnesses 21 to 22 in the scene.

The effect of the conversion represented by the curve 31 is to shift the intensities in the 8-bit image up to a range of intensity values from a value 34 to a value 35 corresponding to the upper portion of the characteristic curve 23 of the film. This conversion can be used to correct an under exposed image or to shift a correctly exposed image to give an over exposed image.

It should be noted that because of the way in which the graphs 30 and 31 have been drawn to facilitate the above explanation, the two ranges 32 to 33 and 34 to 35 appear not to occupy the full range of 8-bit values. In each graph 30, 31 the vertical axis corresponds to a range of intensities that could be represented by the 8-bit data and the ranges 32 to 33 and 34 to 35 correspond to the range of intensities actually represented by the 8-bit data. That is to say, the intensity 32 is represented by the 8-bit value corresponding to zero and the intensity 33 is represented by the 8-bit value corresponding to 255. The equally spaced intensities between the intensity 32 and the intensity 33 are represented by correspondingly equally spaced 8-bit values. Thus, the intensity range 32 to 33 is represented by values across the full 8-bit range from zero to 255. Similarly, the intensity range 34 to 35 is represented by correspondingly spaced values across the full 8-bit range.

Once all of the converted data for an image (some 2000×3000 pixels) has been loaded into the frame store 16, a process taking about 30 seconds, the processor 17 is arranged to operate in a preview mode in which the data in the store 16 is read by the processor 17 and output for display of the image on the monitor 19. The user of the system 10 is thus able to inspect attributes of the image such as colour balance and contrast. If the attributes of the displayed image are acceptable to the user the data is transferred to a bulk store 36 under user control effected by manipulation of the stylus and touch tablet device 18. The bulk store 36 may for example be a video tape recorder or multiple disc store.

However, if the attributes of the displayed image are unacceptable to the user, the operation of the scanner 11 and the look up table can be altered so as to change the conversion effected thereby. Merely changing values in the look up table 15 and adjusting light levels and then rescanning the image on the film does not avoid the above discussed problem of delay between making the adjustment and being able to view the effect of the adjustment on the monitor 19. Therefore, in order to overcome this problem the processor 17 is arranged to enable the alterations to be made to the image as it is read from the store 16 for display of the image on the monitor 19. The alteration performed by the processor 17 is controlled by the user via the stylus and touch tablet device 18 and since the monitor 19 is refreshed at around 25 times per second, depending on the display standard used, the user is able to preview immediately the result of his alterations in the displayed image.

During the preview mode of operation, the processor 17 is arranged to generate data representing a control menu for display together with the image on the monitor 19. The processor 17 also generates data representing a cursor for display on the monitor 19 at a position corresponding to that of the stylus on the touch tablet. The displayed control menu (not shown) comprises three menu boxes which can be selected by the user by way of the cursor in order to vary the alteration function performed by the processor 17 on the data read for display. FIG. 5 is a plot of the alteration function performed by the processor to produce luminance data for display ($Y_{DISPLAY}$) from luminance data in the store ($Y_{STORE}$). Initially the alteration function is linear, i.e. $Y_{DISPLAY}=Y_{STORE}$, as represented by the straight line plot 38 joining the origin 39 to the point 40 at $Y_{DISPLAY}(\text{Max})=Y_{STORE}(\text{Max})$ via three intermediate points 41 to 43 corresponding to shadows, mid-tones and highlights in the image. The positions of the three intermediate points 41 to 43 can be controlled by the user by way of the menu boxes. Initially the three menu boxes contain values of $Y_{DISPLAY}$ at the three points 41, 42 and 43, but by selecting a menu box and varying the value contained therein the user can alter the position of a selected point. For example, by selecting the menu box corresponding to the mid-tone point 42 and increasing the value contained in the box the mid-tone point is moved to a new position 42'. In response to the point 42 being positioned at the new position 42' the processor 17 calculates a cubic spline (or other polynomial line fitting approximation) defining a line 44 connecting the points 39, 42' and 40. The thus calculated cubic spline is then taken to be the alteration function performed by the processor 17 during the reading of data from the store 16 to the monitor 19.

The other two menu boxes provide the user with control over the values of shadows and highlights in the image. For example, the shadow value of point 41 could be reduced to that of point 41' and the highlight value of point 43 could be increased to that of point 43', cubic splines being calculated to define the line 45 joining the points 39, 41', 42, 43' and 40. In another example, the shadow, mid-tone and highlight values of points 41, 42, 43 are all shifted down to the values of points 41", 42", 43" and cubic splines are calculated to define the line 46 joining the points 39, 41", 42", 43" and 40. In each case, once the new position of the points has been selected the cubic splines joining the new points provide the alteration function performed by the processor in deriving data for display from the data in the store. Instead of using menu boxes to control the shadow, mid-tone and highlight values the processor 17 can be arranged to generate data representing a graph, similar to that shown in FIG. 5, for display superimposed over the image with the points being selected and moved by way of the cursor.

As described, the $Y_{STORE}$ intensity value of each point 41, 42, 43 is fixed at a preset value. However, the intensity values need not be fixed in this way and the processor 17 could be arranged such that the user is able to use the cursor to select one pixel in the displayed image as having a luminance equal to the shadow value (point 41) another pixel as having a luminance equal to the mid-tone value (point 42) and a further pixel as having a luminance equal to the highlight value (point 43). Once the luminance values ($Y_{STORE}$) of the points had been so defined, the user would then be free to alter the $Y_{DISPLAY}$ values of the points as described hereinabove.

It may also be desirable under certain circumstances (depending on the characteristic curve of the film and the transfer function of the scanner) to be able to introduce an offset by moving the point 39 away from the origin of the graph and indeed, although less likely, to move the point 40 away from the position $Y_{DISPLAY}(\text{Max})=Y_{STORE}(\text{Max})$. If required, user control over the positions of the points 39 and 40 may additionally be provided by the processor 17.

User defined alterations are effected by the processor 17 to only the luminance (Y) component of the YCrCb data held in the store 16. This is because providing the user with control over the chrominance (CrCb) components would require an unnecessarily complex system and would result in unpredictable (by the user) changes in the attributes of the displayed image. Luminance is in fact logarithmic and the relationship between $Y_{DISPLAY}$ and $Y_{STORE}$ is of the form $Y_{DISPLAY}=Y^{\gamma}_{STORE}$, where $\gamma$ is the gradient of the line 38, 44, 45 or 46 in FIG. 5. Chrominance is also logarithmic and if the user was provided with control over chrominance values the relationship would be of the form $(Cr,Cb)_{DISPLAY}=(Cr,Cb)^{\gamma}_{STORE}$ which would give values of the product CrCb in addition to values of Cr and Cb raised to the power $\gamma$. It is the values of the product CrCb that would result in unpredictable tonal changes in the image.

The calculation of cubic splines can be effected very quickly and therefore the processor 17 is able to determine the alteration function apparently instantaneously as the user adjusts the shadow, mid-tone and highlight values and to apply the alteration function apparently immediately to the data output to the monitor. Thus, the user is able to see the effect of his adjustment of the values in the displayed image without any undesirable delay.

Once the user is satisfied with the attributes of the displayed image the processor 17 operates in a control mode in which it calculates from the cubic spline data defining the alteration function, new data for the look up table 15 and new settings for the light source 12. The film 13 is then re-scanned and the new 12-bit data from the scanner 11 is converted by the look up table into new 8-bit data which is stored in the frame store 16. The alteration function performed by the processor 17 is reset to the function corresponding to the straight line 38 in FIG. 5 and once all of the new 8-bit data for the image has been stored in the store 16 it is read for display of the image represented thereby on the monitor 17. Ideally, the new 8-bit data will have the attributes desired by the operator and can be stored in the bulk store 36 without any further changes being necessary. However, it is possible that further changes to the data may be required. This is because when the 8-bit data is created by the look up table image information is inevitably lost. Alterations required to the 8-bit data to obtain the desired attributes in the displayed image will be different to the changes necessary to obtain the same attributes in the image represented by the 12-bit data. The differences may be significant for example if the conversion performed by the look up table is shifted one way or the other towards highlights or shadows in the image.

Where further change is required the user again varies the alteration function performed by the processor 17 operating in the preview mode until the image as displayed comprises the desired attributes. Once the user is again satisfied with the displayed image, the processor again operates in the control mode to calculate new data for the look up table and new light settings for the scanner. The image is then scanned again and once all of the new data has been written to the frame store 16 the new image is displayed on the monitor 19 for inspection by the user. It may be necessary to repeat this procedure two or three times in order to obtain acceptable 8-bit data representing the image. In this way the loss of information in converting between 12-bit and 8-bit data is minimized. In adjusting the conversion of the look up table to obtain an image with the desired attributes, the 8-bit data automatically contains the most relevant picture information, namely the information relating to the desired attributes.

The system 10 is intended for use with movie film and therefore the film 13 will normally comprise multiple image frames. Once the look up table contents and light settings have been adjusted for the first one or two frames on the film 13 no further adjustment will be necessary and so the 8-bit data can be transferred directly from the look up table 15 to the bulk store 36 without further interaction by the user.

The system 10 thus enables a user to adjust interactively attributes in a displayed image and thereby to effect adjustment to the scanning of an image and the conversion of the data from the scanning to a format suitable for further processing. The interaction facilitates use of the system and reduces the overall time taken to set up the scanner and the look up table.

There has been described an apparatus and method in which an image represented by data derived by scanning an initial captured image is displayed on a monitor and characteristics or attributes of the displayed image are adjusted, the adjustment being used subsequently to alter the manner in which the initial captured image is scanned so that a further scanning of the image will provide data representing the image with characteristics or attributes similar to those in the previously displayed image.

Having thus described the present invention by reference to a preferred embodiment it is to be well understood that the embodiment in question is exemplary only and that modifications and variations such as will occur to those possessed of appropriate knowledge and skills may be made without departure from the spirit and scope of the invention as set forth in the appended claims and equivalents thereof.

What is claimed is:

1. An electronic image processing apparatus for processing digital data representing an image captured on an image medium and having attributes determined by the capturing of the image and characteristics of the image medium, the apparatus comprising:

an image scanner for scanning the captured image to produce digital image data defining a multiplicity of image elements which together represent the intensities in the image to a high digital and high spatial resolution;

a converter for converting the high digital and high spatial resolution data from the scanning means into intensity data at a lower digital and high spatial resolution suitable for digital processing, the image attributes being changed as a consequence of the scanning and converting;

a store for storing the converted lower digital and high spatial resolution image data from the scanning means;

a display for displaying at the lower digital and high spatial resolution an image derived from the data in the store;

a user operable input device for modifying the displayed image; and a processor operable in a preview mode for reading the data from the store and altering the read data in accordance with an alteration function determined in response to signals input thereto by user manipulation of said input device, the processor thereby altering at video rate the attributes of the image represented by the read data and outputting the altered read data to the displaying means for display of the altered image to enable user inspection of the altered attributes thereof, and operable in a control mode for generating control data depending on the alteration function determined during the preview mode for effecting a corresponding alteration to the scanning by said scanner and converting by the converter so that in a subsequent scanning and converting operation the image attributes are changed to values closer to those of the image previously displayed on the display in said preview mode after modification of said alteration function by signals supplied to the processor from said user device.

2. An apparatus as claimed in claim 1, wherein the scanner comprises a light source for illuminating the captured image and a charge coupled device for producing said digital image data, the level of illumination by said light source being controllable by said processor in accordance with the control data generated in said control mode.

3. An apparatus as claimed in claim 1, wherein the converting means comprises a look up table containing a multiplicity of entries which together define the relationship between the high digital and high spatial resolution data from the scanner and the lower digital and high spatial resolution data for the processor, the entries in the look up table being adjustable by the processor in accordance with the control data generated in said control mode.

4. An apparatus as claimed in claim 3, wherein scanner is adapted to produce data in one color format and the look up table entries are adapted to convert the data from the scanner into data in another color format.

5. An apparatus as claimed in claim 1, wherein during said preview mode the processor is arranged to generate data representing a menu comprising a plurality of predetermined alterable function values and in response to user manipulation of the input device to generate data representing a cursor, the menu data and the cursor data being output to the display for display of the menu and cursor thereon, each of the alterable function values being variable by user controlled manipulation of the cursor in the displayed menu.

6. An apparatus as claimed in claim 5, wherein during said preview mode the processor is arranged to determine the alteration function by calculating a polynomial equation which defines values including the predetermined alterable function values.

7. An apparatus as claimed in claim 6, wherein during said preview mode the processor is arranged to calculate the polynomial equation as a cubic spline.

8. An apparatus as claimed in claim 5, wherein the alterable function values are preset values.

9. An apparatus as claimed in claim 5, wherein the alterable function values are determined by the values of pixels selected by the user in the displayed image.

10. An apparatus as claimed in claim 1, wherein the input device comprises a stylus and touch tablet device.

11. An apparatus as claimed in claim 1, wherein the image medium comprises a film carrying an emulsion representing the image, the attributes being related to the light transfer characteristic of the film and emulsion.

12. A method of processing digital data representing an image captured on an image medium and having attributes determined by the capturing of the image, the method comprising:

scanning the captured image to produce digital image data defining a multiplicity of image elements which together represent intensities in the image to a high digital and high spatial resolution;

converting the high digital and high spatial resolution data produced by the scanning into intensity data at a lower digital and high spatial resolution, suitable for digital processing, the image attributes being changed as a consequence of said scanning and converting;

storing the converted lower digital and high spatial resolution image data in a store;

displaying at the lower digital and high spatial resolution an image derived from the stored data;

reading the data from the store;

manipulating an input device to determine an alteration function;

altering the read data in accordance with the alteration function so as to alter at video rate the attributes of the image represented thereby;

displaying the altered image represented by the altered data to enable user inspection of the altered attributes thereof;

generating control data depending on the alteration function; and effecting on the basis of the control data a corresponding alteration to the scanning and converting operation so that in a subsequent scanning and converting operation the image attributes are changed to values closer to those of the previously displayed image.

13. The method as claimed in claim 12, further comprising illuminating the captured image during said scanning and controlling the level of illumination of said image in accordance with said control data.

14. The method as claimed in claim 12, further comprising altering predetermined points of the alteration function and calculating a replacement alteration function from said altered predetermined points.

15. An apparatus as claimed in claim 1, wherein said alteration function measures the difference between the illumination of the displayed image and the illumination of the image represented by the data in the store.

16. The method as claimed in claim 12, wherein the alteration function measures the difference between the illumination of the displayed image and the illumination of the image represented by the data in the store.

* * * * *